United States Patent [19]
Lang et al.

[11] Patent Number: 5,530,614
[45] Date of Patent: Jun. 25, 1996

[54] PROPORTIONAL VALVE CONTROL UNIT FOR AUXILIARY POWER STEERING

[75] Inventors: Armin Lang, Schwäbisch Gmünd; Walter Cerny, Mutlangen, both of Germany

[73] Assignee: ZF Friedrichshafen AG, Friedrichshafen, Germany

[21] Appl. No.: 256,099

[22] PCT Filed: Dec. 15, 1992

[86] PCT No.: PCT/EP92/02906

§ 371 Date: Jun. 20, 1994

§ 102(e) Date: Jun. 20, 1994

[87] PCT Pub. No.: WO93/12965

PCT Pub. Date: Jul. 8, 1993

[30] Foreign Application Priority Data

Dec. 21, 1991 [DE] Germany .................. 41 42 546.4

[51] Int. Cl.⁶ .................................. H01H 47/32
[52] U.S. Cl. .................................................. 361/154
[58] Field of Search .................... 361/152, 153, 361/154, 155, 156, 139, 160, 203; 180/132

[56] References Cited

U.S. PATENT DOCUMENTS

| | | | |
|---|---|---|---|
| 4,546,403 | 10/1985 | Nielsen | 361/154 |
| 4,667,117 | 5/1987 | Nebgen et al. | 361/154 X |
| 4,737,882 | 4/1988 | D'onofrio | 36/154 |

*Primary Examiner*—Fritz M. Fleming
*Attorney, Agent, or Firm*—Larson & Taylor

[57] ABSTRACT

Auxiliary power steering for motor vehicles with an electromagnetically activated proportional valve whose magnetic coil is regulated as a function of a pulsed voltage frequently produces whistling sounds. The invention remedies this in that the starting sides of the voltage pulses commence at different time intervals with respect to each other. The resultant negligible "white noise" is not disturbing in the general noise level of a motor vehicle.

5 Claims, 1 Drawing Sheet

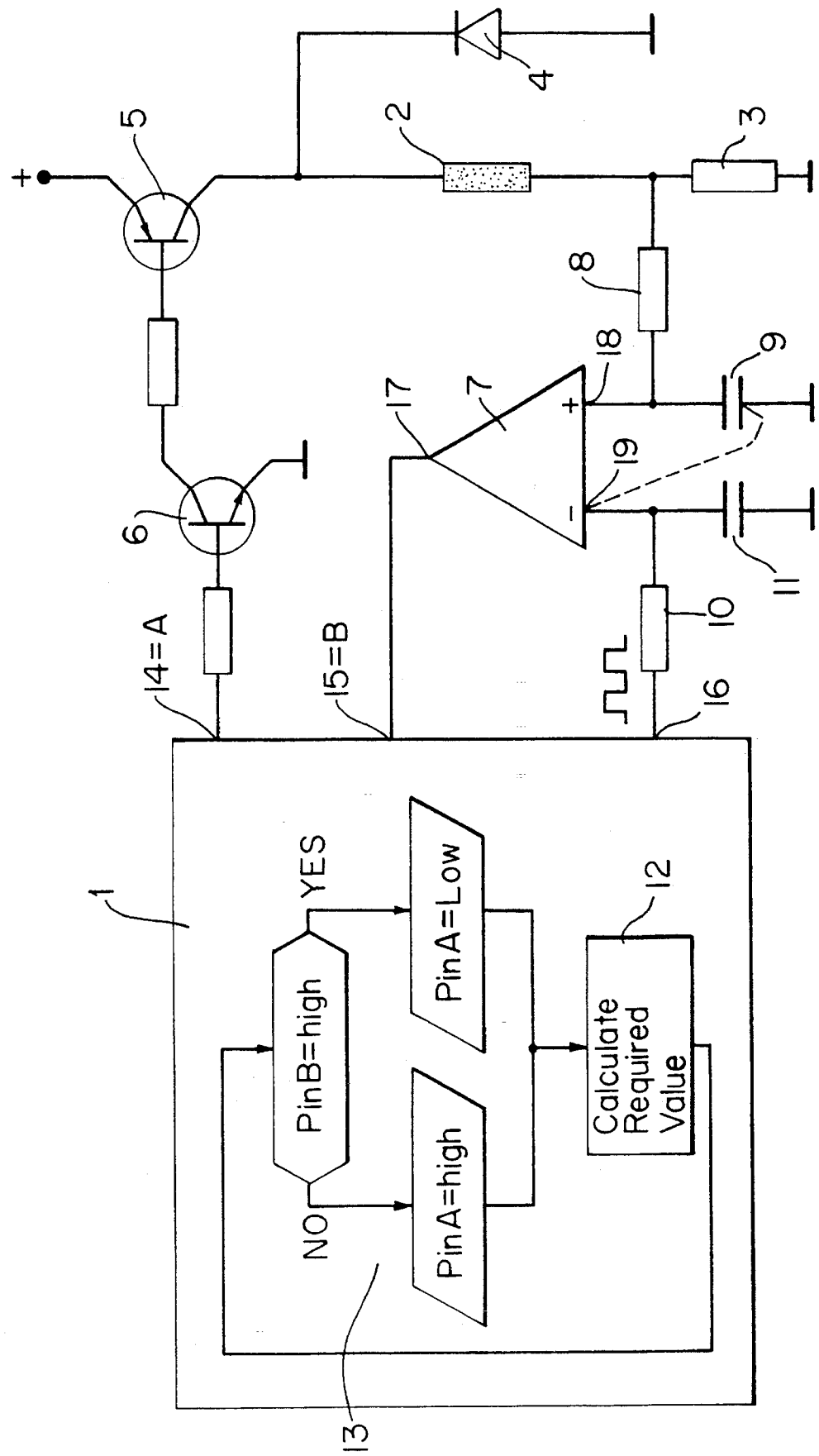

PROPORTIONAL VALVE CONTROL UNIT FOR AUXILIARY POWER STEERING

BACKGROUND OF THE INVENTION

1. Field of the Invention

This invention relates to an auxiliary power steering for motor vehicles with an electromagnetically activated proportional valve.

2. Description of the Prior Art

A generic auxiliary power steering is known according to EP 01 42 988 B1. Here, a delta voltage is generated by a triangular generator and is compared to a required voltage of a servo amplifier. A delta voltage with a constant frequency, predetermined by the triangular generator, develops at the output of the comparator. The pulse length is generated in proportion to the required voltage value. This results in a constant energizing frequency for the valve. Such valves frequently produce a whistling sound that is noticed in the vehicle and that is felt to be very annoying.

SUMMARY OF THE INVENTION

The purpose of the invention is to prevent the disturbing whistling sounds in an auxiliary power steering of the kind described initially. This problem is solved by the features of the invention.

The starting sides of the voltage pulses begin at different time intervals; therefore, no constant frequency can be formed and no whistling sound can be generated. Instead, one gets a rather negligible noise that does not have a disturbing effect in the remaining noise level within the vehicle.

The noise can become a so-called "white noise" if the interval changes irregularly according to another proposal of the invention.

The pulse sequence according to the invention can be generated with a processor unit in a simple manner without influencing the current regulation to any major extent.

The invention will be described in greater detail with the help of the drawing that is confined to those points that are essential in understanding the invention.

BRIEF DESCRIPTION OF THE DRAWING

The single FIGURE shows a control unit in accordance with the present invention.

DESCRIPTION OF THE PREFERRED EMBODIMENT

The FIGURE shows the control unit for a magnetic coil 2 of an electromagnetically activated proportional valve (not shown), which control unit includes a processor unit 1 with three ports of which the first port 14 is connected via a driving stage 6 to a power transistor 5. The power transistor regulates the power supply current of a magnetic coil 2 as a function of a pulsed voltage applied at the first port 14. Magnetic coil 2 and a current precision resistor 3 are bridged with a recovery diode 4 in the usual manner.

The current of magnetic coil 2 is tapped as voltage on the current precision resistance 3 and is then supplied to a non-inverting second input 18 of a comparator 7 via a second resistance 8 and a second filter capacitor 9. A pulsed required current value is supplied from the third port 16 of processor unit 1 likewise via a first resistance 10 and a first filter capacitor 11 to an inverting, first input 19 of comparator 7. An output 17 of comparator 7 is connected with a second port 15.

Processor unit 1 calculates the required value 12 according to the rules of logic and contains a logic circuit 13 in which the second port 15 is interrogated in a regular sequence at irregular intervals to determine the actual value and where an opposite signal is always put out to the first port 14. If the required value is greater than the actual value, then the power transistor is turned off and if the required value is smaller than the actual value, the power transistor 5 is turned on.

If power transistor 5 is energized, a current flows through magnetic coil 2 and precision resistor 3 that rises according to an e-function. If the voltage on the precision resistor 3 reaches the magnitude of the required voltage value at the comparator input, the power transistor 5 is again turned off via driving stage 6 and processor unit 1 and comparator 7. That results ill a kick-back voltage on magnetic coil 2 and that voltage, via the recovery diode 4, generates a recovery current that drops again according to the turn-on time of power transistor 5 and the inside resistance of magnetic coil 2. If the voltage on the current precision resistor 3 falls short of the switching threshold of comparator 7, power transistor 5 is turned on again and the procedure begins anew.

The interrogation time of processor unit 1 is independent of the procedures described; therefore, the power transistor 5 is turned on and turned off at stochastic time intervals. The interrogation at the second port does not take place at an exact voltage level on the non-inverting input of comparator instead, it takes place according to the program that runs independently of the voltage curve. That results in a small error during the energizing of power transistor 5. On the basis of probability, however, this error is so distributed over the turn-on and turn-off time that by way of a mean value, one gets a power supply current of magnetic coil 2 according to the required voltage value, although with an accidental, constantly changing frequency. Here, the term "frequency" means the number of voltage pulses per unit of time. Thus, the leading edge of the voltage pulses begin at different time intervals with respect to each other and that, again, prevents the whistling sounds.

It is, however, basically also possible to have the third port 16 connected with the non-inverting input 18 and magnetic coil 2 with the inverting input 19 of comparator 7. One must merely make sure that a current will flow through magnetic coil 2 if the required value is greater than the actual value and that it is turned off when the required value is smaller than the actual value. If the second filter capacitor 9 is not grounded but if it is instead connected to the first inverting input 19 as shown by the dotted line in the FIGURE of comparator 7, one gets a superposition of the actual value voltage on top of the required value. As a result, the circuit does not regulate with respect to the peak value of the actual voltage but rather with respect to its arithmetic mean because the required voltage value is dynamically made to follow the actual value.

This measure makes the circuit extensively independent of the on-board voltage fluctuations and any changes in the interior resistance of the magnetic coil 2.

References
1 Processor unit
2 Magnetic coil
3 Current precision resistor
4 Recovery diode
5 Power transistor
6 Driving stage 7 Comparator
8 Second resistance
9 Second filter capacitor
10 First resistance
11 First filter capacitor
12 Required value
13 Logic branch
14 First port
15 Second port
16 Third port
17 Output of comparator
18 Non-inverting input
19 Inverting input

We claim:

1. Auxiliary power steering for motor vehicles with an electromagnetically activated proportional valve having a magnetic coil through which flows a power supply current that is regulated by a power transistor as a function of a pulsed voltage, wherein voltage pulses of the pulsed voltage are modulated in terms of their pulse length as a function of a required voltage value characterized in that said voltage pulses are supplied to the power transistor and leading edges of said voltage pulses commence at different time intervals with respect to each other.

2. Auxiliary power steering according to claim 1, wherein the interval changes irregularly.

3. Auxiliary power steering according to claim 1, further comprising a processor unit with at least three ports, wherein said power transistor is connected to the first port, that said processor unit generates a pulsed required value signal which is applied to the third port that is connected, via a first resistance with a first input of a comparator and a first filter capacitor that is grounded, whereby a second input of comparator is grounded via a second filter capacitor and is connected via a second resistance to a magnetic coil that has a recovery diode connected to it in parallel, that an output of said comparator is connected with the second port of processor unit, that processor unit interrogates the second port in cycles that are independent of a voltage curve to determine an actual value of the current flow and so controls the first port that a current flows from the power transistor through the magnetic coil when the required value is greater than the actual value and the current flow from the power transistor is turned off when the required value is smaller than the actual value.

4. Auxiliary power steering according to claim 3, further comprising a driving stage connected in front of said power transistor.

5. Auxiliary power steering according to claim 4, wherein the second filter capacitor is not grounded but is instead connected to said first input of said comparator.

* * * * *